UNITED STATES PATENT OFFICE.

JOHN C. BILLS, OF OTTUMWA, AND CARROLL M. BILLS, OF ALBIA, IOWA.

IMPROVEMENT IN PAINTS FOR ROOFING, WOOD, METALS, &c.

Specification forming part of Letters Patent No. 140,991, dated July 22, 1873; application filed July 8, 1873.

*To all whom it may concern:*

Be it known that we, JOHN C. BILLS, of the town of Ottumwa, county of Wapello, and CARROLL M. BILLS, of the town of Albia, county of Monroe, and State of Iowa, have invented or discovered a certain composition of ingredients forming a paint, called "Bills's Tin and Iron Roofing Preservative," of which the following is a specification:

"Bills's Tin and Iron Roofing Preservative" is composed of the following ingredients, viz: Coal-tar, Japan varnish, asphaltum varnish, spirits turpentine, glycerine, and sulphate zinc. Each ingredient is proportioned as follows: To thirty-three (33) gallons of coal-tar add two (2) gallons Japan varnish, three (3) gallons asphaltum varnish, two (2) gallons spirits turpentine, two (2) pounds sulphate zinc.

These several ingredients, after being mixed together, should be well stirred, and the composition should be thinned with spirits turpentine before using, so that it will work easy and spread well from the brush after being applied. It should be thick enough to form a body upon the tin or iron, without running, as heavy as "three-coat" work of oil and ocher as it is commonly used.

This paint or preservative, when applied, soon becomes gummy, forming a good body, and adheres to the tin or iron. The heat of the sun does not cause it to crack, scale, or peel off. The paint cannot be broken by bending the tin until the tin itself is broken. It will not soften by the heat of the sun and run and drip, but will become hard and firm, remaining on a roof and preserving it from rust until it is worn off by the weather. It will, to a great extent, stop leakages in defective roofs, and will not ignite when exposed to fire-heat, after it has been applied and becomes dry. It will preserve tin, iron, and zinc from rust longer than any preservative now in use, and can be manufactured and applied much cheaper. When applied to a fence-post, covering the part to be inserted in the ground, it will preserve it much longer than it would otherwise last, and can be used to great advantage on either tin, iron, zinc, or wood which is under water. When applied to trees or vines it will exterminate borers and insects.

What we claim as our invention or discovery is—

The combination of the several ingredients used, with the proper proportion of each ingredient, and the manner of compounding and using the same, as set forth in the foregoing specification.

JOHN C. BILLS.
CARROLL M. BILLS.

Witnesses:
R. L. TURPIN,
WM. L. CHIPLEY.